(12) United States Patent
Hinojosa et al.

(10) Patent No.: US 11,812,182 B1
(45) Date of Patent: Nov. 7, 2023

(54) FIELD OF VIEW HANDOFF FOR HOME SECURITY

(71) Applicant: UIPCO, LLC, San Antonio, TX (US)

(72) Inventors: Cynthia Ann Hinojosa, Selma, TX (US); Stephen Anthony Young, Boerne, TX (US); Nathan Lee Post, Rockport, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 12 days.

(21) Appl. No.: 17/481,531

(22) Filed: Sep. 22, 2021

Related U.S. Application Data

(60) Provisional application No. 63/084,348, filed on Sep. 28, 2020.

(51) Int. Cl.
| | |
|---|---|
| *H04N 5/268* | (2006.01) |
| *G06V 20/56* | (2022.01) |
| *H04N 5/00* | (2011.01) |
| *H04N 7/18* | (2006.01) |
| *H04N 23/61* | (2023.01) |
| *H04N 23/90* | (2023.01) |

(52) U.S. Cl.
CPC ............. *H04N 5/268* (2013.01); *G06V 20/56* (2022.01); *H04N 7/188* (2013.01); *H04N 23/61* (2023.01); *H04N 23/90* (2023.01)

(58) Field of Classification Search
None
See application file for complete search history.

(56) References Cited

U.S. PATENT DOCUMENTS

| | | | |
|---|---|---|---|
| 10,269,257 B1* | 4/2019 | Gohl | H04N 13/239 |
| 11,012,667 B1* | 5/2021 | Nodder | G06V 20/52 |
| 2018/0106092 A1* | 4/2018 | Singh | E05F 15/74 |
| 2019/0163974 A1* | 5/2019 | Ding | G06F 16/7335 |
| 2020/0258208 A1* | 8/2020 | Lota | G06T 7/90 |

* cited by examiner

*Primary Examiner* — Edemio Navas, Jr.
(74) *Attorney, Agent, or Firm* — Plumsea Law Group, LLC

(57) ABSTRACT

A method and system for using a vehicle camera to capture visual information for a home security system is described. In one embodiment, the method includes detecting a trigger event to activate at least one home security camera of a home security system of a dwelling. The method also includes analyzing activity of a target person near the dwelling using the at least one home security camera. Based on the analyzed activity, the method includes activating at least one camera of a vehicle located at or near the dwelling. The method further includes capturing visual information associated with the target person using the at least one camera of the vehicle.

20 Claims, 8 Drawing Sheets

FIELD OF VIEW HANDOFF FOR HOME SECURITY

This application claims the benefit of U.S. Provisional Patent Application Ser. No. 63/084,348 filed on Sep. 28, 2020 and titled "Field of View Handoff for Home Security", the disclosure of which is incorporated by reference in its entirety.

BACKGROUND

The present embodiments relate to home security in general, and more particularly, to a system and method for providing a field of view handoff between a home security camera and a camera of a vehicle.

Home security camera use in and around a person's home to record video and obtain images that can be useful for the police or other authorities to identify and track down suspects and other persons of interest has become more widespread. However, even as home security camera use becomes more common, thieves and other criminals have also become aware of the limitations associated with these cameras to take advantage of blind spots or other gaps in camera coverage where they cannot be observed or recognized on camera.

There is a need in the art for a mechanism that can assist with providing an enhanced field of view for home security camera coverage to overcome these drawbacks.

SUMMARY

In one aspect, a method for using a vehicle camera to capture visual information for a home security system is provided. The method includes detecting a trigger event to activate at least one home security camera of a home security system of a dwelling. The method also includes analyzing activity of a target person near the dwelling using the at least one home security camera. Based on the analyzed activity, the method includes activating at least one camera of a vehicle located at or near the dwelling. The method further includes capturing visual information associated with the target person using the at least one camera of the vehicle.

In another aspect, a home security system is provided. The home security system includes a processor associated with a computer or server of a home network of a dwelling. The home security system also includes at least one home security camera in communication with the processor over the home network and at least one camera of a vehicle located at or near the dwelling. The vehicle in communication with the processor over the home network. The processor of the home security system is configured to detect a trigger event to activate the at least one home security camera, analyze activity of a target person near the dwelling using the at least one home security camera, and, based on the analyzed activity, activate the at least one camera of the vehicle. The processor is also configured to capture visual information associated with the target person using the at least one camera of the vehicle.

In another aspect, a method for providing a field of view handoff between a home security camera and a camera of a vehicle for a home security system is provided. The method includes determining if a vehicle including at least one camera is in place at or near a dwelling. The method also includes determining a field of view of at least one home security camera associated with a home security system of the dwelling. The method includes determining a field of view of the at least one camera of the vehicle and determining an overlap area wherein a portion of the field of view of the at least one home security camera overlaps with a portion of the field of view of the at least one camera of the vehicle. The method further includes automatically switching from visual information captured by the at least one home security camera to visual information captured by the at least one camera of the vehicle when a target person detected by the home security camera enters into the overlap area.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

According to the principles of the example embodiments described herein, a vehicle camera may be used to capture visual information for a home security system. A system and method for providing a field of view handoff between a home security camera and a camera of a vehicle is provided. The present embodiments provide a mechanism for automatically switching a video feed from a home security camera to a vehicle camera as needed to enlarge or expand a field of view that may be recorded around a home. Specifically, the example embodiments may use image recognition and artificial intelligence (AI) techniques to detect and track a target person or object near a home of a user using a home security camera, determine a direction of movement of the target person or object, and turn on one or more cameras of a vehicle at the home to record additional or supplemental footage of the target person or object.

Figure 1:
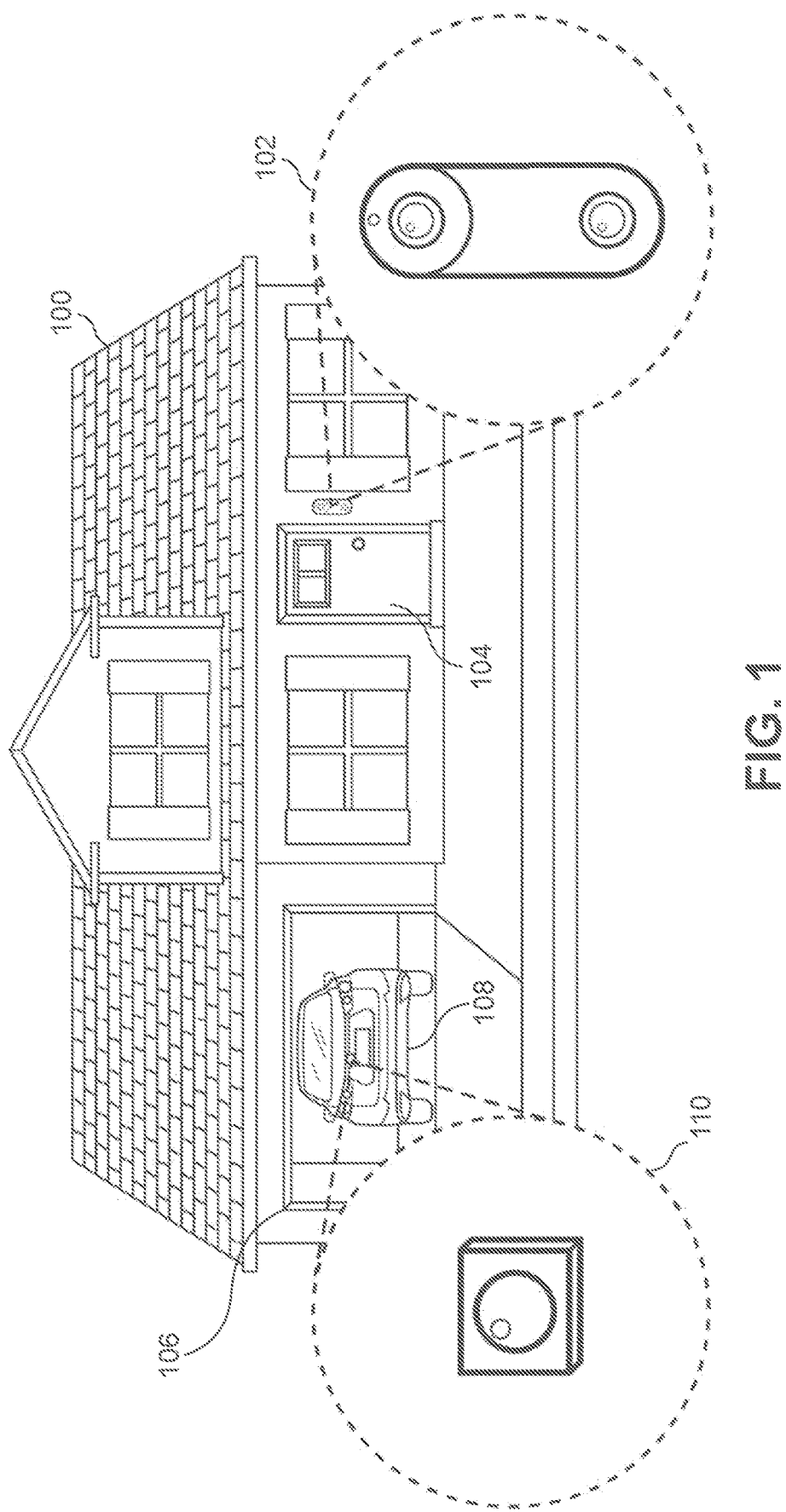
FIG. 1 is a representational view of an example embodiment of a home in which the techniques described herein for providing a handoff of a field of view from a home security camera to a camera of a vehicle may be implemented.

Referring now to FIG. 1, an example embodiment of a dwelling 100 is shown. In one embodiment, dwelling 100 is a house or home of a user. In other embodiments, dwelling 100 may be any other building or structure that includes a home security camera, such as an apartment, a business, a storage facility, etc. In some embodiments, dwelling 100 includes a home security system comprising at least one home security camera 102 (also referred to herein as "camera 102"). In this embodiment, camera 102 is a front-facing doorbell camera provided on an exterior portion of dwelling 100. For example, as shown in FIG. 1, camera 102 is located adjacent to a front door 104 of dwelling 100 and is positioned in a way as to have an unobstructed view of a person at or approaching front door 104.

In some embodiments, dwelling 100 may also include a space or structure that is configured for parking or storing a vehicle at a location in proximity to dwelling 100. For example, in this embodiment, dwelling 100 includes a garage 106 that is configured to store or house a motor vehicle 108. Although exemplary embodiments show an enclosed garage attached to dwelling 100, in other embodiments, garage 106 may include any provision, building, shed, or structure where one or more vehicles may be parked, stored, or housed, including structures attached to dwelling 100 and/or physically separate from dwelling 100, such as a garage, carport, driveway, or parking space. Motor vehicle 108 may be any kind of motor vehicle, including a car, SUV, truck, bus, motorcycle, or other vehicle.

In some embodiments, vehicle 108 may include at least one camera. For example, many vehicles have one or more cameras located at various locations in and around the vehicle, such as dash cameras located inside the vehicle, rear-view cameras located at a rear portion of the vehicle, front-facing cameras located at a front portion of the vehicle, overhead cameras located on or near a roof of the vehicle, side-cameras located on side mirrors or other sides of the vehicle, and/or cameras otherwise associated with the vehicle at other locations on the exterior and/or interior of the vehicle. In the example embodiment shown in FIG. 1, vehicle 108 is a car that includes at least a rear-view camera 110 located on a rear portion of vehicle 108. For example, in this embodiment, rear-view camera 110 is located above a license plate and below a rear windshield of vehicle 108. In other embodiments, rear-view camera 110 may be located in or near a bumper of vehicle 108, along a rear roof line (e.g., in or above the rear windshield) of vehicle 108, or elsewhere on vehicle 108.

In an example embodiment, rear-view camera 110 on vehicle 108 is configured to provide a view of persons and/or objects that are located behind vehicle 108 to a driver. For example, rear-view camera 110 may be located above the license plate on the rear portion of vehicle 108 and can display a video or image of an area of the driveway of dwelling 100 located behind vehicle 108, when vehicle 108 is parked in garage 106 or in the driveway.

Figure 2:
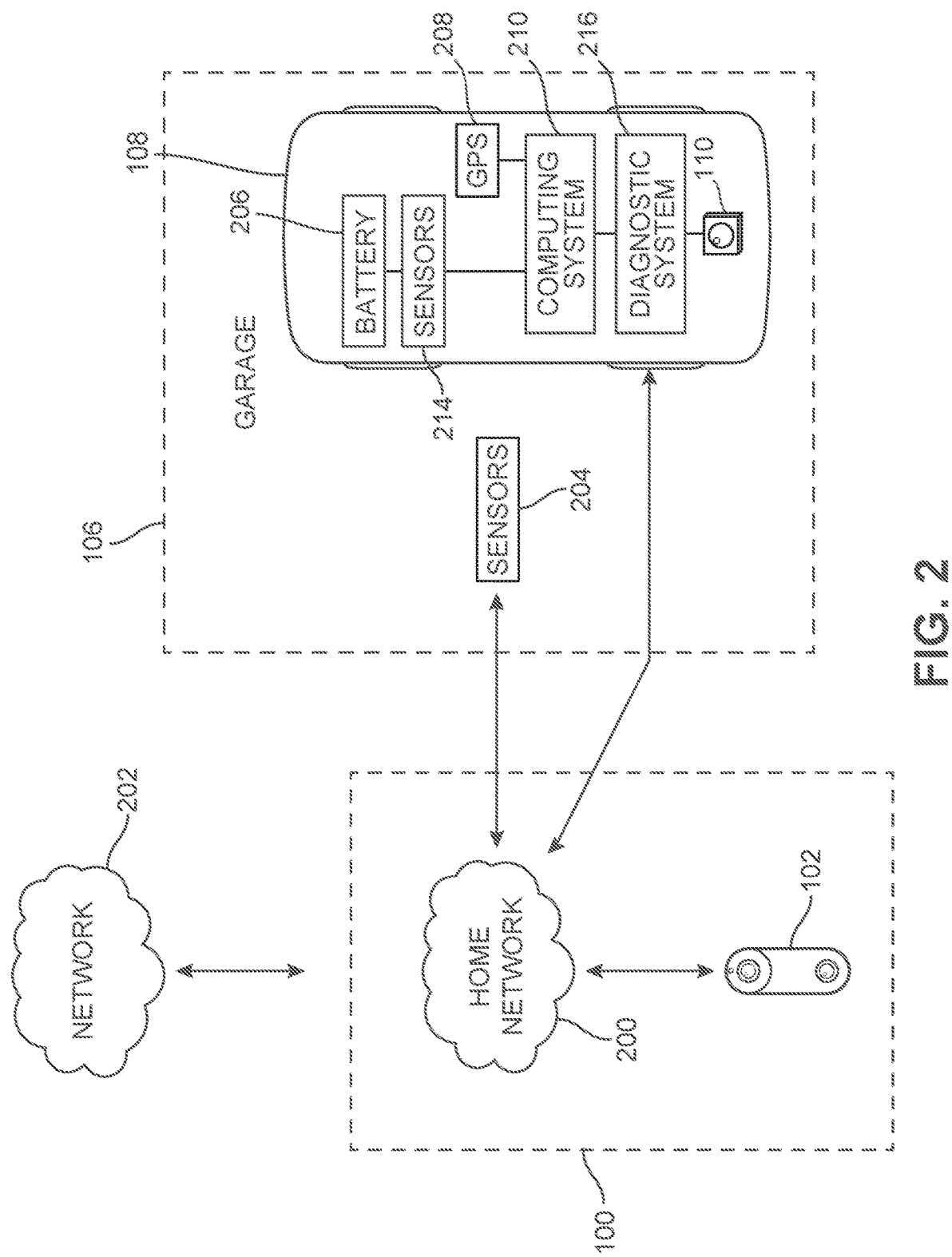
FIG. 2 is a schematic view of an example embodiment of a system for providing a handoff of a field of view from a home security camera to a camera of a vehicle.

In some embodiments, a home security camera, for example, camera 102, and one or more cameras of a vehicle, for example, rear-view camera 110, may be connected via a home network to enable communication between the home security camera, the cameras of the vehicle, and other components of a system for providing a field of view handoff in a home, such as dwelling 100. Referring now to FIG. 2, an example embodiment of many of the interconnected systems, devices, and resources that may exist in a motor vehicle (e.g., vehicle 108) and in a home network 200 associated with dwelling 100 are shown.

In an example embodiment, vehicle 108 may include a computing system 210. The term "computing system" refers to the computing resources of a single computer, the partial computing resources of a single computer, a plurality of computers communicating with one another, and/or a network of remote computers and/or servers. For example, in the embodiment shown in FIG. 2, vehicle 108, specifically computing system 210 of vehicle 108, is connected to a home network 200. Computing system 210 of vehicle 108 may communicate with home network 200 using any type of wireless communication, including, but not limited to WiFi, cellular, Bluetooth, or any other communication technology. In some embodiments, home network 200 may be a local area network ("LAN"), including a wireless local area network ("WLAN"). In other embodiments, home network 200 may be a wide area network ("WAN"), including a wireless wide area network ("WWAN"), for example, the Internet. In yet other embodiments, home network 200 may be a combination of a WAN and a LAN and may include a combination of wired and/or wireless communication technologies.

In some embodiments, home network 200 may be in communication with at least one remote network 202. In an example embodiment, remote network 202 may be associated with one or more of the home security cameras located in dwelling, such as camera 102. For example, remote network 202 may include a cloud server or other privately owned network that includes one or more computing systems that use artificial intelligence (AI) or machine-learning (ML) techniques to implement various functions, including, but not limited to: image recognition, object recognition, and/or facial recognition techniques, using image and/or video information obtained from the home security cameras installed at dwelling 100, for example, camera 102. In an example embodiment, home network 200 may communicate with remote network 202 over the Internet.

In some embodiments, the home security system may include one or more sensory devices (or simply, sensors) that may communicate over home network 200. For example, the sensors may be disposed in various locations in and around dwelling 100, including inside and/or outside. Some embodiments may include one or more sensors 204 disposed within a garage (e.g., garage 106 of dwelling 100). Sensors 204 disposed within the garage may include one or more of various types of sensors that may be used to provide information about garage 106, including whether or not vehicle 108 is present or absent. The information from sensors 204 may be provided to the home security system via home network 200.

For example, in some embodiments, sensors 204 disposed within the garage may include motion detection sensors configured to detect movement within garage 106. Sensors 204 may also include occupancy or object detection sensors configured to detect the presence or absence of objects, such as vehicle 108, within garage 106. Sensors 204 may further include beam sensors that project a light beam to a receiver disposed opposite the projecting light source to detect when an object has crossed the light beam, thereby tripping the sensor to indicate the presence of the object. For example, garage 106 may include a beam sensor disposed across an opening to garage 106 to trigger a safety mechanism of a garage door of garage 106 so that the garage door does not close on an object or person. In some embodiments, these existing beam sensors may be included as one or more of sensors 204. In still other embodiments, sensors 204 may include radio-frequency (RF) beacon transmitters or reflectors that are configured to transmit and/or reflect signals from sensors associated with vehicle 108. It should be understood that sensors 204 may include a combination of one or more of these types of sensors or other suitable sensors that are configured to provide information about garage 106, including whether or not vehicle 108 is present or absent.

Some embodiments may include a set of vehicle sensors 214 associated with vehicle 108. In some embodiments, set of vehicle sensors 214 may be proximity sensors (e.g., ultrasonic or other RF sensors) that are configured to detect how close an object is to portions of vehicle 108 where sensors 214 are located. For example, in many cases, a vehicle (e.g., vehicle 108) may have proximity sensors disposed in or near front and rear bumpers of the vehicle to assist a driver with maneuvering the vehicle without colliding or bumping into nearby objects.

In some embodiments, set of vehicle sensors 214 may be used to detect or sense the proximity to one or more of garage sensors 204. For example, in cases where garage sensors 204 include RF beacon transmitters or reflectors, set of vehicle sensors 214 may use the transmitted or reflected RF signals from sensors 204 to detect or sense the proximity of vehicle 108 within garage 106 of dwelling 100. In some embodiments, information from sensors 214 disposed in or on the vehicle (e.g., vehicle 108) may be accessible through a diagnostics system 216 associated with the vehicle. In some cases, diagnostics system 216 may comprise part of onboard computing system 210 of vehicle 108.

Vehicle 108 may also include a GPS component. In the example of FIG. 2, vehicle 108 includes an onboard GPS receiver 208 that can receive GPS information. GPS information may include a variety of different parameters associated with vehicle 108, including, but not limited to location, velocity/speed, and time. In other embodiments, GPS receiver 208 may be further configured to provide information about parameters. This information from GPS receiver 208 also may be accessed through the vehicle's diagnostic system 216, which may comprise part of onboard computing system 210 of vehicle 108.

In the embodiment of FIG. 2, vehicle 108 includes a battery 206. Battery 206 may provide electrical power to one or more components of vehicle 108, including, but not limited to: sensors 214, GPS receiver 208, computing system 210, diagnostic system 216, and/or rear-view camera 110, as well as other conventional components and systems of a vehicle (e.g., lights, engine/motor, HVAC, radio, etc.). In some embodiments, the home security system of the example embodiments may access information about the vehicle's battery life to determine if battery 206 can sustain running computing system 210, sensors 214, GPS receiver 208, diagnostic system 216, and other various components or systems of vehicle 108 without running out of power (i.e., without draining battery 206 to a level that would not allow vehicle 108 to be started or operated). In some embodiments, this battery life information also may be accessed through the vehicle's diagnostic system 216, which may comprise part of onboard computing system 210 of vehicle 108, as described above.

In an example embodiment, any of the information obtained or detected by or from vehicle 108 may be provided to the home security system via home network 200. For example, information from sensors 214, GPS receiver 208, computing system 210, diagnostic system 216, and/or rear-view camera 110 may be provided from vehicle 108 to the home security system through home network 200. Vehicle 108 may include a WiFi transceiver or other suitable network component that is configured to allow communication with home network 200. For example, computing system 210 may include a WiFi card that includes hardware and/or software to enable communication with home network 200.

In the embodiment of FIG. 2, home security camera 102 communicates with remote network 202 over home network 200. Camera 102 may feed information and live footage to remote network 202, which may include a cloud of servers and backend devices that support the home security camera functions, including AI and image recognition, as described above. In some embodiments, home network 200 may include at least one processor associated with a computer. For example, home network 200 may include a router, server, or other computing device that includes a processor configured to implement the techniques of the example embodiments described herein.

In addition, in some embodiments, one or more new assets, such as additional cameras, sensors, or other components, may be added to the home security system. In these cases, the home security system according to the example embodiments may include provisions to orient, associate, and/or integrate the new asset, such as an additional camera, into home network 200 so as to be available to the home security system. In some cases, the new asset may also be one or more additional cameras associated with a motor vehicle, for example, a dash camera, another rear-view camera, or other camera associated with vehicle 108. By making the new asset available to the home security system, the additional sensor(s) or camera(s) may be used to provide additional information to the home security system in accordance with the techniques described herein.

Figure 3:
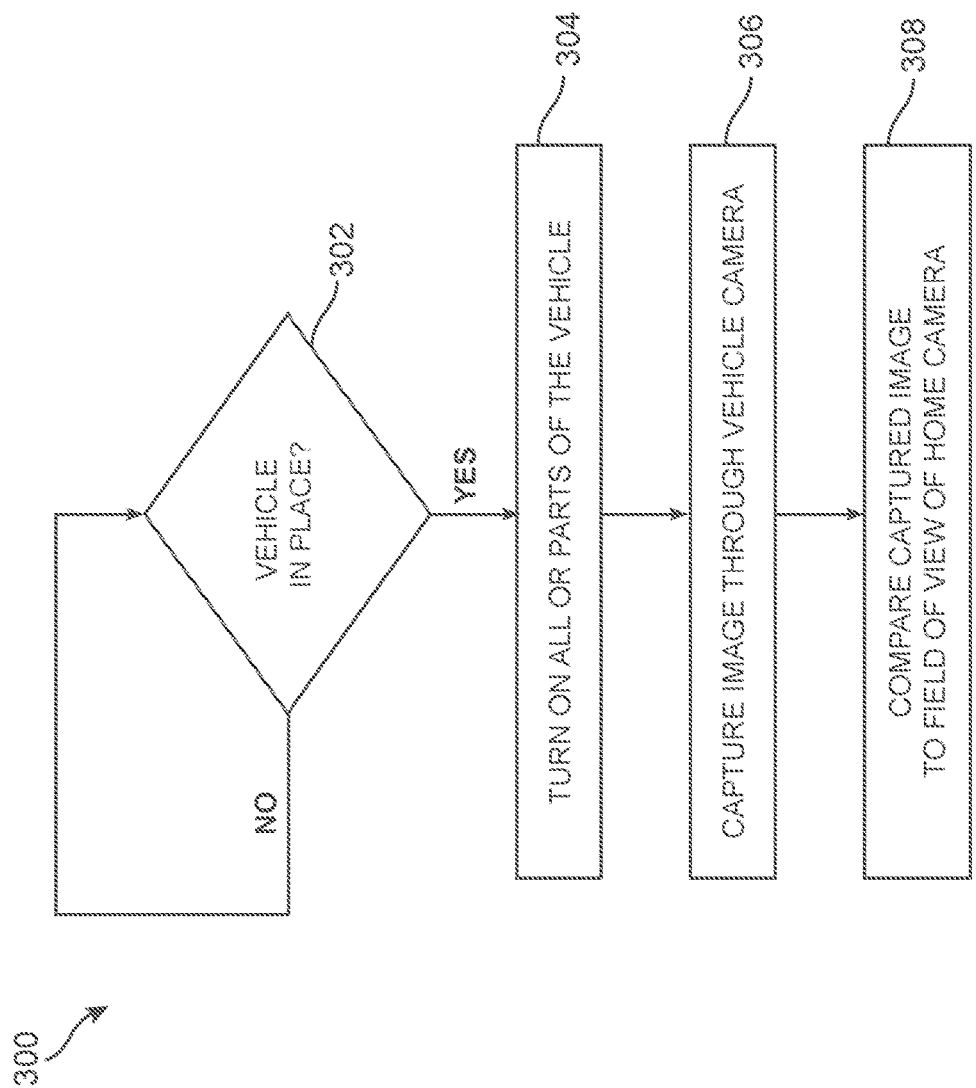
FIG. 3 is a flowchart of an example embodiment of a method for determining a field of view of a camera of a vehicle.

Referring now to FIG. 3, a flowchart of an example embodiment of a method 300 for determining a field of view of a camera of a vehicle is shown. In some embodiments, the home security system may use home network 200 to communicate with vehicle 108 to implement operations of method 300. In this embodiment, method 300 may begin with an operation 302. At operation 302, the system may determine whether or not the vehicle having at least one camera is in place (e.g., vehicle 108 having rear-view camera 110). In the illustrated embodiments, "in place" refers to the vehicle being parked in the garage (e.g., garage 106 of dwelling 100, as shown in FIG. 1 above). In other embodiments, "in place" can mean that the vehicle is parked in the carport, driveway, parking space, or other regular parking spot. In other embodiments, "in place" can mean that the vehicle is anywhere adjacent or close enough to the house (e.g., dwelling 100) that the vehicle can be connected to the home network (e.g., home network 200). In this embodiment, at operation 302, the system determines whether vehicle 108 is on the premises in garage 106 or otherwise in place as described above.

Figure 4:
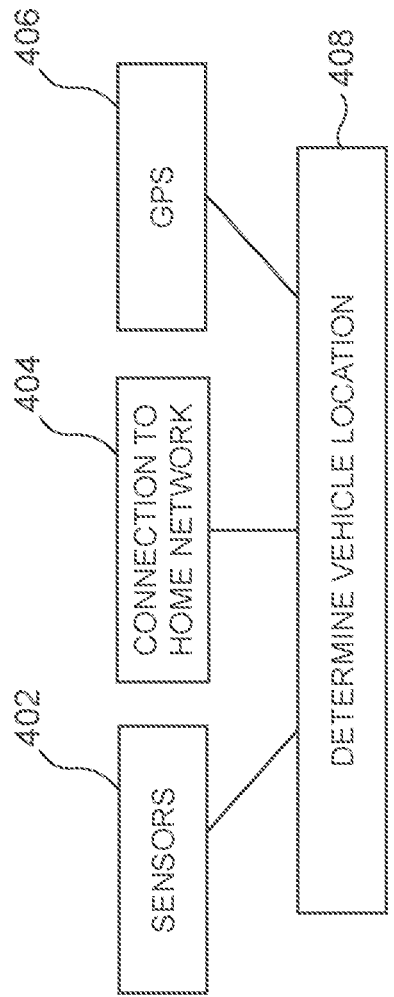
FIG. 4 is a schematic view of an example embodiment of factors used to determine a vehicle location.

For example, the process of determining whether or not the vehicle is in place as part of operation 302 may be described in relation to FIG. 4, which illustrates a variety of factors that may be used to determine a vehicle location. In this embodiment, FIG. 4 is an expanded view of operation 302 of FIG. 3, in which the system determines whether the vehicle is in place and therefore if it may be available to be used as a resource. Some factors that may be used to gather and determine location information associated with vehicle 108 include sensors 402, a connection 404 to home network 200, and/or GPS information 406.

In an example embodiment, sensors 402 that may be used to determine the location of vehicle 108 (e.g., its presence or absence in garage 106 or whether it is otherwise in place) may include the one or more sensors 204 in garage 106 and/or sensors 214 associated with vehicle 108, as described above. In embodiments where vehicle 108 is parked outside or in a location near dwelling 100, other sensors may be used to determine the location of vehicle 108. Using information from sensors 402 that confirms or detects the presence of vehicle 108, operation 302, therefore, may determine that vehicle 108 is in place.

In some embodiments, GPS information 406 may use GPS receiver 208 in vehicle 108 to compare the location of vehicle 108 to the location of dwelling 100. In some embodiments, this location information may be sufficient to determine that the vehicle is within a predetermined distance of dwelling (e.g., 3 feet, 6, feet, 10 feet, etc.) to determine that the vehicle is in place. That is, if the GPS information 406 indicates that vehicle 108 is within the predetermined distance to dwelling 100, then operation 302 may determine that vehicle 108 is in place.

In some embodiments, connection 404 to home network 200 may be used as a factor to determine whether vehicle 108 is in place. For example, when vehicle 108 arrives at dwelling 100 (e.g., parks in garage 106) it may automatically connects to home network 200. This connection 400, therefore, may be used a factor at operation 302 of method 300 to confirm that vehicle 108 is in place at dwelling 100. In other embodiments, the system may use multiple factors to confirm the location of the vehicle. For example, in some embodiments, operation 302 may use at least two factors from the group of sensors 402, connection 404, and GPS information 406 that indicate or confirm that vehicle 108 is in place in order to make a positive determination that the vehicle is in place (e.g., the result is YES at operation 302) as part of method 300. In addition, it should be understood that other factors may be used at operation 302 to determine whether or not the vehicle is in place, including, for example, manual confirmation by a user or through image recognition of scenery captured by rear-view camera 110 of vehicle 108 that indicates that vehicle 108 is in place at dwelling 100.

Referring back to FIG. 3, upon determining at operation 302 that a vehicle (e.g., vehicle 108) is not in place (i.e., the result at operation 302 is NO), then method 300 proceeds back to the beginning and the home security system may continue to monitor location data for the vehicle until it can determine that the vehicle is located near dwelling. In some cases, method 300 may wait a predetermined time period before proceeding to operation 302 again. In other cases, method 300 may wait until an initiation event or other trigger condition that causes the home security system to implement method 300 and check whether a vehicle is in place at operation 302. For example, an initiation event or trigger condition may be detection of the vehicle using any of the factors shown in FIG. 4 (e.g., sensors 402 detect the presence of vehicle 108, connection 404 to home network 200, and/or GPS information 406) or a motion alert or detection of a person or object by the home security camera (e.g., camera 102) that causes or triggers method 300 to begin.

Upon determining at operation 302 that the vehicle is in place (i.e., the result at operation 302 is YES), then method 300 may proceed to an operation 304. At operation 304, an instruction may be sent to turn on all or parts of the vehicle. For example, the home security system may send the instruction to computing system 210 in vehicle 108 through home network 200 to turn on (i.e., provide power to) one or more components or systems of vehicle 108, such as one or more cameras, including rear-view camera 110. In some embodiments, only necessary components or systems of vehicle 108 to capture video and/or image data or other sensor information may be powered on at operation 304. For example, these components or systems may include battery 206, computing system 210, rear-view camera 110, GPS receiver 208, and/or one or more sensors 214. In other embodiments, all components or system of vehicle 108 may be powered on (i.e., provided with electricity).

After operation 304, method 300 may proceed next to an operation 306. At operation 306, an instruction may be sent to vehicle 108 to capture an image (or images) and/or video from at least one vehicle camera. For example, at operation 306, the home security system may send the instruction to computing system 210 in vehicle 108 through home network 200 to capture one or more images and/or video using rear-view camera 110. The instruction sent to the vehicle at operation 306 may further include instructions to return the captured image(s) and/or video to the home security system. For example, at operation 306 computing system 210 in vehicle 108 may use home network 200 to send the captured image(s) and/or video from rear-view camera 110 to the home security system.

Upon receiving the captured image(s) and/or video from operation 306, method 300 may proceed to an operation 308. At operation 308, image recognition/analysis may be used to compare a visual field of view from the captured image obtained by the vehicle camera (e.g., rear-view camera 110 of vehicle 108) to a visual field of view from an image captured or obtained by the home security camera (e.g., camera 102, described above). For example, in some embodiments, the comparison may be performed by at least one processor associated with the home security system. In other embodiments, the image(s) from the vehicle camera (e.g., rear-view camera 110) and the home security camera (e.g., camera 102) may be sent to cloud servers via remote network 202, which may use AI and/or ML techniques to compare the visual field of views from the two cameras.

Using the information gathered from the comparison of the captured images at operation 308, method 300 may be used to infer the location of the vehicle camera relative to the home security camera. With this arrangement, the relative locations of the cameras and their associated field of views may be used to determine a handoff area where the field of view of the home security camera overlaps with at least a portion of the field of view of the vehicle camera.

In some embodiments, method 300 illustrated in FIG. 3 may occur after the home security system has detected motion through at least one home security camera, for example, camera 102. In other embodiments, method 300 may be implemented each time vehicle 108 pulls into garage 106 or is otherwise parked "in place" near dwelling 100. In other embodiments, method 300 may occur regularly at predetermined intervals of time. For example, every hour, every 4-6 hours, once a day, etc. In some cases, the predetermined intervals of time may be scheduled based on day of the week to coincide with a user's schedule, for example, when vehicle 108 is likely to be parked in garage 106.

Figure 5:
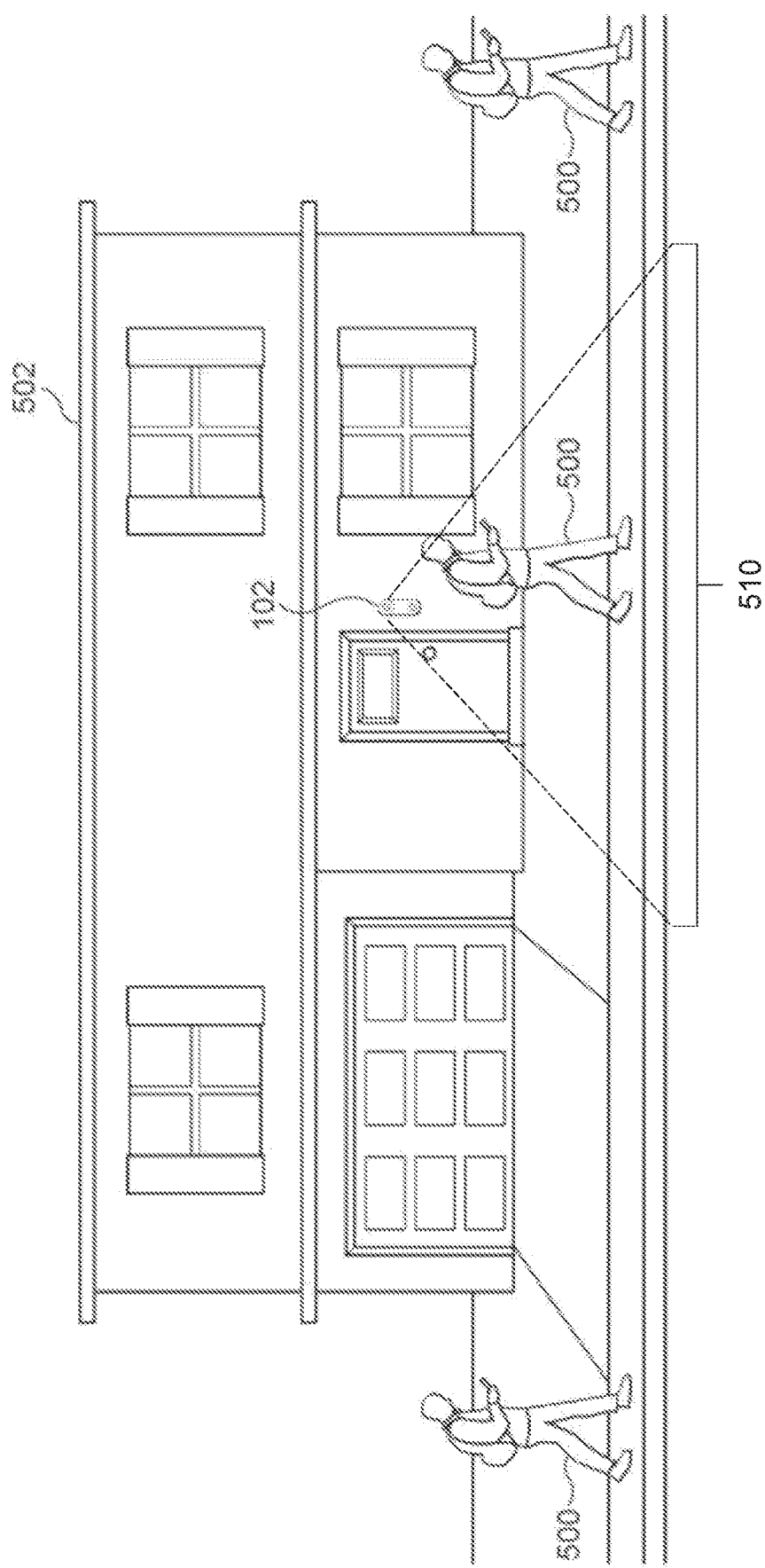
FIG. 5 is a representational view of an example embodiment of a target person walking past a home.

FIG. 5 is a representational view of an example embodiment of a target person walking past a home. In this embodiment, a target person 500 is shown walking past a home 502. In this scenario, home 502 may include a camera, such as camera 102. As can be seen in FIG. 5, target person 500 may be within a field of view 210 of camera 102 while target person 500 is walking directly past the front door of home 502 where camera 102 is located. However, as can also be seen in FIG. 5, when target person 500 is approaching home 500, for example, in front of the garage, target person 500 is not visible to camera 102 (i.e., is not within field of view 510). Similarly, when target person 500 is beyond field of view 510 of camera 102, target person 500 is also no longer visible. In this embodiment, home 502 includes a number of locations of potential gaps in coverage of camera 102 where target person 500 is not within the limited field of view 510 of camera 102. Therefore, camera 102 may be not able to capture or obtain an image or video of target person 500 in these locations.

Figure 6:
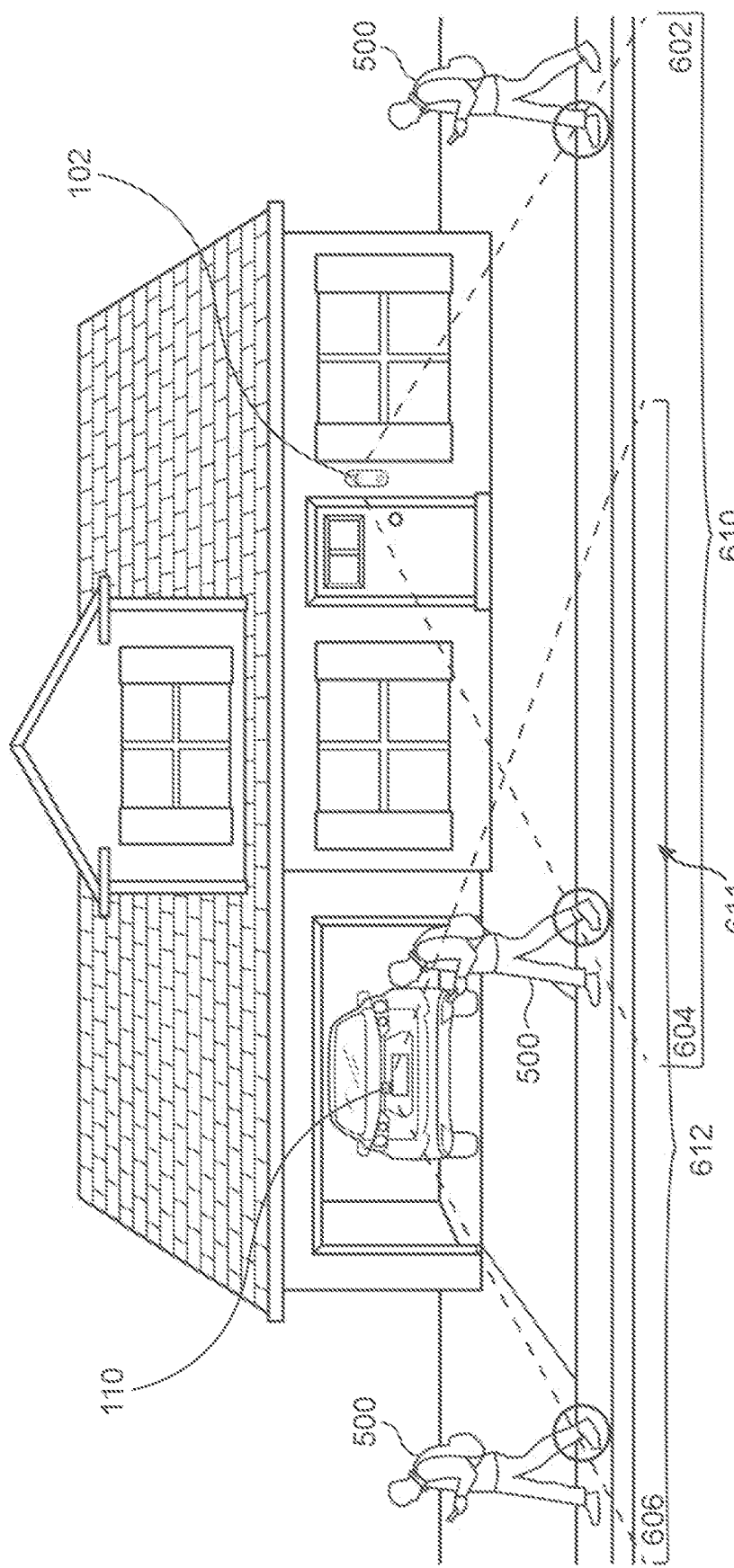
FIG. 6 is a representational view an example embodiment of determining a field of view of a home security camera and a camera of a vehicle.

In contrast, the techniques of the present embodiments provide a system and method for providing a field of view handoff between a home security camera and a camera of a vehicle. The present embodiments, therefore, provide a mechanism for automatically switching a video feed from a home security camera to a vehicle camera as needed to enlarge or expand a field of view that may be recorded around a home. Referring now to FIG. 6, an example embodiment of determining a field of view of a home security camera and a camera of a vehicle is shown according to the techniques presented herein.

In this embodiment, dwelling 100 includes home security camera 102 and at least one vehicle camera, for example, rear-view camera 110 of vehicle 108, as described above. In an example embodiment, when target person 500 approaches dwelling 100, target person 500 enters within a field of view 610 of camera 102 at a first point 602. From first point 602 to a second point 604, target person 500 is within field of view 610 of camera 102 in front of dwelling 100. As target person 500 passes second point 604, target person 500 is no longer within field of view 610 of camera 102.

According to the techniques described herein, at second point 604, target person 500 is within a field of view 612 of rear-view camera 110 of vehicle 108 parked in garage 106 of dwelling 100. Thus, at second point 604 until a third point 606, target person 500 may still be visible (e.g., captured on video and/or images) by the home security system in dwelling 100 through the use of rear-view camera 110 (i.e., target person 500 remains within field of view 612). Field of view 612 of rear-view camera 110 of vehicle 108 parked in garage 106 of dwelling 100 acts to supplemental field of view 610 of camera 102, effectively enlarging or expanding the total visible field of view available to the home security system of dwelling 100.

Additionally, as shown in this embodiment, field of view 610 of camera 102 overlaps with field of view 612 of rear-view camera 110 at an overlap area 611. That is, overlap area 611 is a portion of the total visible field of view associated with dwelling 100 where at least a portion of field of view 610 of camera 102 overlaps with at least a portion of field of view 612 of rear-view camera 110. Thus, when target person 500 is within overlap area 611, target person 500 may be visible to both camera 102 and rear-view camera 110 of vehicle 108.

In an example embodiment, overlap area 611 may be a handoff area where the home security system automatically switches a video feed from a home security camera (e.g., camera 102) to a vehicle camera (e.g., rear-view camera 110) as needed to enlarge or expand a total visible field of view that may be recorded around a home (e.g., dwelling 100). As will be described below, the techniques of the present embodiments provide a system and method for providing a field of view handoff between the home security camera (e.g., camera 102) to the vehicle camera (e.g., rear-view camera 110) within the handoff area (e.g., overlap area 611).

FIGS. 5 and 6 depict two scenarios of a target person (e.g., target person 500) as they walk or move across the front of a home or dwelling (e.g., home 502, dwelling 100). While these embodiments depict an example of a person, target person 500 may be any person, animal, or object that triggers the home security camera to record (e.g., camera 102). For example, in some embodiments, target person 500 may be a vehicle.

Figure 7:
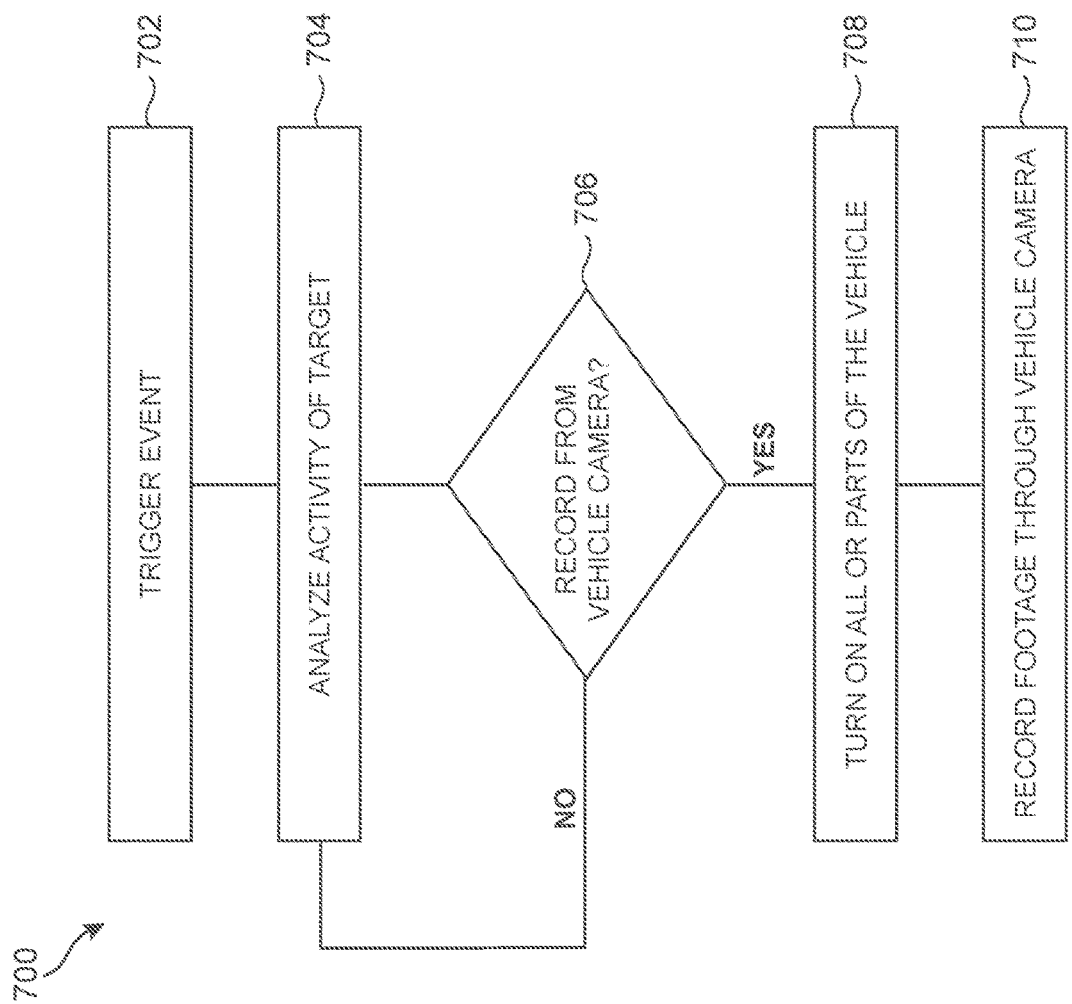
FIG. 7 is a flowchart of an example embodiment of a method for providing a handoff of a field of view from a home security camera to a camera of a vehicle.

Referring now to FIG. 7, a flowchart of an example embodiment of a method 700 for providing a handoff of a field of view from a home security camera to a camera of a vehicle is shown. In some embodiments, method 700 may be implemented by at least one processor associated with a computer or server. For example, in one embodiment, method 700 may be implemented by a processor of a computer or server associated with a home security system. In other embodiments, method 700 may be implemented by a processor of another computer or server, for example, the cloud server associated with remote network 202, described above.

In an example embodiment, method 700 may begin with an operation 702. At operation 702 a trigger event of some type occurs. A trigger event may be any suitable event or condition that activates the home security system to begin recording through one or more cameras, such as camera 102. An example of a trigger event may be a person or object detected by a home security camera using motion detection technology or may be a manual activation of the home security system by a homeowner or other user. For example, a trigger event at operation 702 may be camera 102 using motion-sensing capabilities to detect target person 500 as they enter field of view 610 of camera 102 at first point 602.

Next, method 700 may include an operation 704. At operation 704, activity of the target (i.e., target person 500) is analyzed by the home security system. For example, at operation 704, the home security system may use motion-sensing with intelligence capabilities (e.g., associated with camera 102 and/or cloud server of remote network 202) to analyze target person 500 as they move through field of view 610 of camera 102 past the front of dwelling 100 in the direction of garage 106, as shown in FIG. 6 above.

Method 700 includes an operation 706 where a determination is made of whether or not to record (i.e., capture or obtain images and/or video) from at least one vehicle camera. This determination may be based on the analyzed activity information gathered at operation 704, as well as information obtained as part of method 300, as shown in FIGS. 3 and 4 above. For example, based on the information, the home security system may conclude that target person 500 is traveling in the direction of garage 106, and therefore should be traveling into field of view 612 of rear-view camera 110 of vehicle 108. In another example, the home security system may determine that target person 500 is moving away from garage 106 and that the home security system will not activate rear-view camera 110 of vehicle 108 because target person 500 will not be within field of view 612 of rear-view camera 110 based on their activity.

Upon determining at operation 706 that it will not record visual information using the vehicle camera (i.e., the result of the determination at operation 706 is NO), then method 700 may return to a previous operation, such as operation 704 to continue tracking and analyzing the activity of target person 500 and/or operation 702 to wait until such time as a new trigger event occurs to re-start initiation of method 700.

Upon determining at operation 706 that it will record visual information, such as video and/or images, from the vehicle camera (e.g., rear-view camera 110), then method 700 proceeds to an operation 708. At operation 708, all or parts of the vehicle are turned on. For example, operation 704 may include one or more instructions sent to vehicle 108 that are substantially similar to instructions sent in accordance with operation 304 of method 300, described above in reference to FIG. 3, to turn on (i.e., provide power) to one or more components and/or systems of vehicle 108, including at least one or more cameras, including rear-view camera 110.

Method 700 may then proceed to an operation 710 where visual information (e.g., video footage and/or images) is recorded by the activated vehicle camera. For example, rear-view camera 110 in vehicle 108 may be activated to capture visual information within field of view 612 to capture or obtain video or images of target person 500 as they move out of field of view 610 of camera 102, as shown in FIG. 6.

In some embodiments, the home security camera (e.g., camera 102) may stop recording when the vehicle camera (e.g., rear-view camera 110) starts to record. That is, recording or capturing the visual information associated with dwelling 100 may be subject to a field of view handoff between the home security camera and the camera of the vehicle. For example, as shown in FIG. 6, when target person 500 is within overlap area 611 where field of view 610 of camera 102 overlaps or coincides with field of view 612 of rear-view camera 110 of vehicle 108, the home security system may automatically switch from recording visual information using camera 102 to recording using rear-view camera 110. Thus, overlap area 611 may be determined to be a handoff area where the handoff from the home security camera (e.g., camera 102) to the vehicle camera (e.g., rear-view camera 110) can occur. With this configuration, the present embodiments provide a mechanism for automatically switching a video feed from a home security camera to a vehicle camera as needed to enlarge or expand a field of view that may be recorded around a home.

In other embodiments, both the home security camera and the vehicle camera may be recording at one time (i.e., recording visual information simultaneously). For example, as shown in FIG. 6, when target person 500 is within overlap area 611 in the visual field of views 610, 612 of the two cameras, they may both record footage of target person 500 simultaneously. In some cases, each of the home security camera (e.g., camera 102) and the vehicle camera (e.g., rear-view camera 110) may continue to record visual information for a predetermined period of time after target person 500 leaves or moves outside the respective field of view of the camera (e.g., field of views 610, 612). In some embodiments, the predetermined period may be 30 seconds or less. In other embodiments, the predetermined period may be 1 minute or longer.

Figure 8:
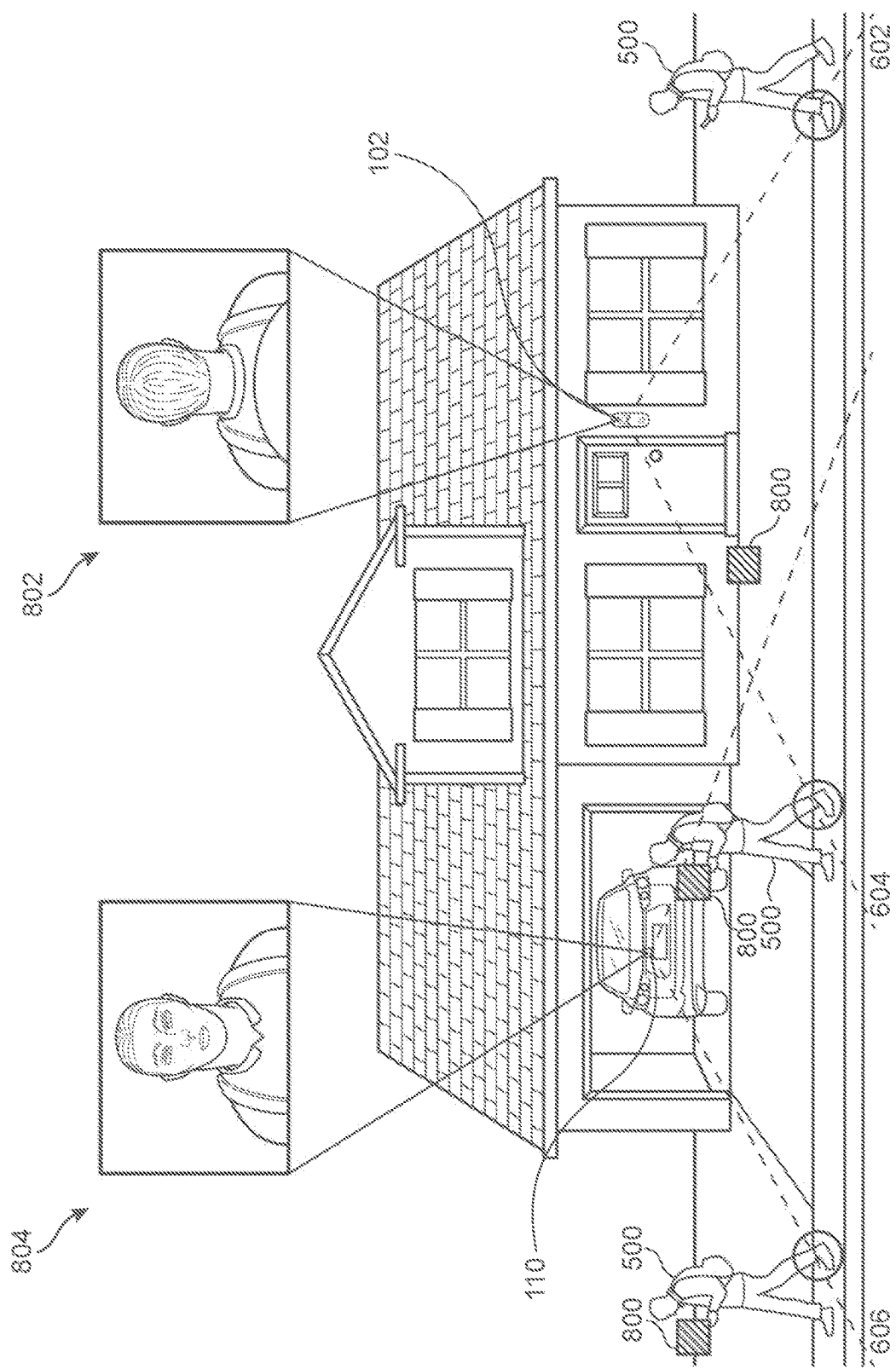
FIG. 8 is a representational view of an example embodiment of using a system for providing a handoff of a field of view from a home security camera to a camera of a vehicle to identify a target person.

FIG. 8 is a representational view of an example embodiment of using a system for providing a handoff of a field of view from a home security camera to a camera of a vehicle to identify a target person. In this embodiment, target person 500 is moving past dwelling 100 that includes a home security system in accordance with the example embodiments described herein. In this scenario, an object 800 is located near the front door of dwelling 100, near camera 102. In some cases, target person 500 may be a thief or criminal who attempts to steal or take object 800.

As shown in FIG. 8, depending on the approach taken by target person 500 when they take object 800, for example, if target person 500 identifies camera 102 and does not expose their face towards camera 102, camera 102 may not obtain sufficient visual information (e.g., video and/or images) to identify target person 500. For example, a first image 802 obtained by camera 102 shows only the back of the head of target person 500, which would not be sufficient to identify target person 500.

In this embodiment, however, the home security system may further activate rear-view camera 110 of vehicle 108 in garage 106 of dwelling 100. For example, while target person 500 exits field of view 610 of camera 102 at second point 604, they will still be within field of view 612 of rear-view camera 110. Therefore, using rear-view camera 110, a second image 804 of target person 500 may be obtained. In contrast to first image 802, second image 804 includes the face of target person 500, which would be sufficient to identify target person 500. With this arrangement, rear-view camera 110 of vehicle 108 parked in garage 106 of dwelling 100 acts to supplemental field of view 610 of camera 102, effectively enlarging or expanding the total visible field of view available to the home security system of dwelling 100.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method for using a vehicle camera to capture visual information for a home security system, the method comprising:
   detecting a trigger event to activate at least one home security camera of a home security system of a dwelling;
   analyzing activity of a target person near the dwelling using the at least one home security camera;
   based on the analyzed activity, determining whether a vehicle is in place at or near the dwelling by detecting a connection between the vehicle and a local area network of the dwelling;
   in response to determining that the vehicle is in place at or near the dwelling, activating at least one camera of the vehicle located at or near the dwelling;
   capturing visual information associated with the target person using the at least one camera of the vehicle; the method further comprising:
   determining a field of view of the at least one home security camera;
   determining a field of view of the at least one camera of the vehicle;
   determining an overlap area wherein a portion of the field of view of the at least one home security camera overlaps with a portion of the field of view of the at least one camera of the vehicle;
   simultaneously capturing visual information associated with the target person within the overlap area using both the at least one home security camera and the at least one camera of the vehicle for a predetermined period of time; and
   upon expiration of the predetermined period of time, automatically switching to only the visual information captured by the at least one camera of the vehicle.

2. The method according to claim 1, wherein activating the at least one camera of the vehicle includes instructing the vehicle to turn on one or more components or systems.

3. The method according to claim 1, wherein the at least one camera of the vehicle is a rear-view camera.

4. The method according to claim 1, wherein the vehicle is parked in a garage associated with the dwelling.

5. The method according to claim 1, wherein the vehicle is parked in a location within a predetermined distance of the dwelling.

6. The method according to claim 1, further comprising:
capturing a first image of the target person using the at least one home security camera;
determining that the first image of the target person does not include a face of the target person; and
capturing a second image of the target person using the at least one camera of the vehicle, wherein the second image includes the face of the target person.

7. The method according to claim 1, wherein determining whether the vehicle is in place at or near the dwelling includes using two factors to make the determination, a first factor being the detection of the connection between the vehicle and the local area network of the dwelling and a second factor including one of: obtaining information from one or more sensors located in a garage of the dwelling, obtaining information from one or more sensors associated with the vehicle, or using GPS information associated with the vehicle.

8. The method according to claim 7, wherein determining whether the vehicle is in place includes obtaining information from at least one sensor of the one or more sensors located in the garage of the dwelling that indicates a presence of the vehicle inside the garage.

9. The method according to claim 1, wherein the predetermined period of time is at least 30 seconds.

10. A home security system, comprising:
a processor associated with a computer or server of a home network of a dwelling;
at least one home security camera in communication with the processor over the home network; and
at least one camera of a vehicle located at or near the dwelling, the vehicle in communication with the processor over the home network;
wherein the processor of the home security system is configured to:
detect a trigger event to activate the at least one home security camera;
analyze activity of a target person near the dwelling using the at least one home security camera;
based on the analyzed activity, determine whether a vehicle is in place at or near the dwelling by detecting a connection between the vehicle and a local area network of the dwelling;
in response to determining that the vehicle is in place at or near the dwelling, activate the at least one camera of the vehicle;
capture visual information associated with the target person using the at least one camera of the vehicle;
determine a field of view of the at least one home security camera;
determine a field of view of the at least one camera of the vehicle;
determine an overlap area wherein a portion of the field of view of the at least one home security camera overlaps with a portion of the field of view of the at least one camera of the vehicle;
simultaneously capture visual information associated with the target person within the overlap area using both the at least one home security camera and the at least one camera of the vehicle for a predetermined period of time; and
upon expiration of the predetermined period of time, automatically switch to only the visual information captured by the at least one camera of the vehicle.

11. The home security system according to claim 10, wherein the vehicle includes an onboard computing system; and
wherein the processor of the home security system is configured to send an instruction to the onboard computing system of the vehicle to turn on the at least one camera prior to capturing visual information.

12. The home security system according to claim 10, further comprising:
at least one sensor disposed in a garage of the dwelling; and
wherein the processor of the home security system is configured to determine a presence of the vehicle in the garage based on information from the at least one sensor.

13. The home security system according to claim 10, further comprising a cloud server of a remote network in communication with the processor of the home security system via the home network; and
wherein the cloud server of the remote network is configured to implement artificial intelligence or machine learning techniques on the captured visual information from the at least one home security camera and/or at least one camera of the vehicle to perform image recognition.

14. The home security system according to claim 10, wherein the vehicle is parked in a garage associated with the dwelling.

15. The home security system according to claim 10, wherein the vehicle is parked in a location within a predetermined distance of the dwelling.

16. The home security system according to claim 10, wherein the processor of the home security system is further configured to:
capture a first image of the target person using the at least one home security camera;
determine that the first image of the target person does not include a face of the target person; and
capture a second image of the target person using the at least one camera of the vehicle, wherein the second image includes the face of the target person.

17. A method for providing a field of view handoff between a home security camera and a camera of a vehicle for a home security system, the method comprising:
determining if a vehicle including at least one camera is in place at or near a dwelling by detecting a connection between the vehicle and a local area network of the dwelling;
determining a field of view of at least one home security camera associated with a home security system of the dwelling;
determining a field of view of the at least one camera of the vehicle;
determining an overlap area wherein a portion of the field of view of the at least one home security camera overlaps with a portion of the field of view of the at least one camera of the vehicle;
simultaneously capturing visual information associated with a target person within the overlap area using both the at least one home security camera and the at least one camera of the vehicle for a predetermined period of time; and upon expiration of the predetermined period of time, automatically switching to only the visual information associated with the target person captured by the at least one camera of the vehicle.

18. The method according to claim 17, wherein determining whether the vehicle is in place at or near the dwelling includes using two factors to make the determination, a first factor being the detection of the connection between the vehicle and the local area network of the dwelling and a second factor including one of: obtaining information from one or more sensors located in a garage of the dwelling, obtaining information from one or more sensors associated with the vehicle, or using GPS information associated with the vehicle.

19. The method according to claim 18, wherein determining whether the vehicle is in place includes obtaining information from at least one sensor of the one or more sensors located in the garage of the dwelling that indicates a presence of the vehicle inside the garage.

20. The method according to claim 17, further comprising sending an instruction to an onboard computing system of the vehicle to turn on the at least one camera of the vehicle prior to capturing visual information.

* * * * *